Jan. 10, 1933.   C. E. YORGASON   1,893,529
AUTOMOBILE BRAKE TESTING DEVICE
Filed Dec. 10, 1929   3 Sheets-Sheet 2
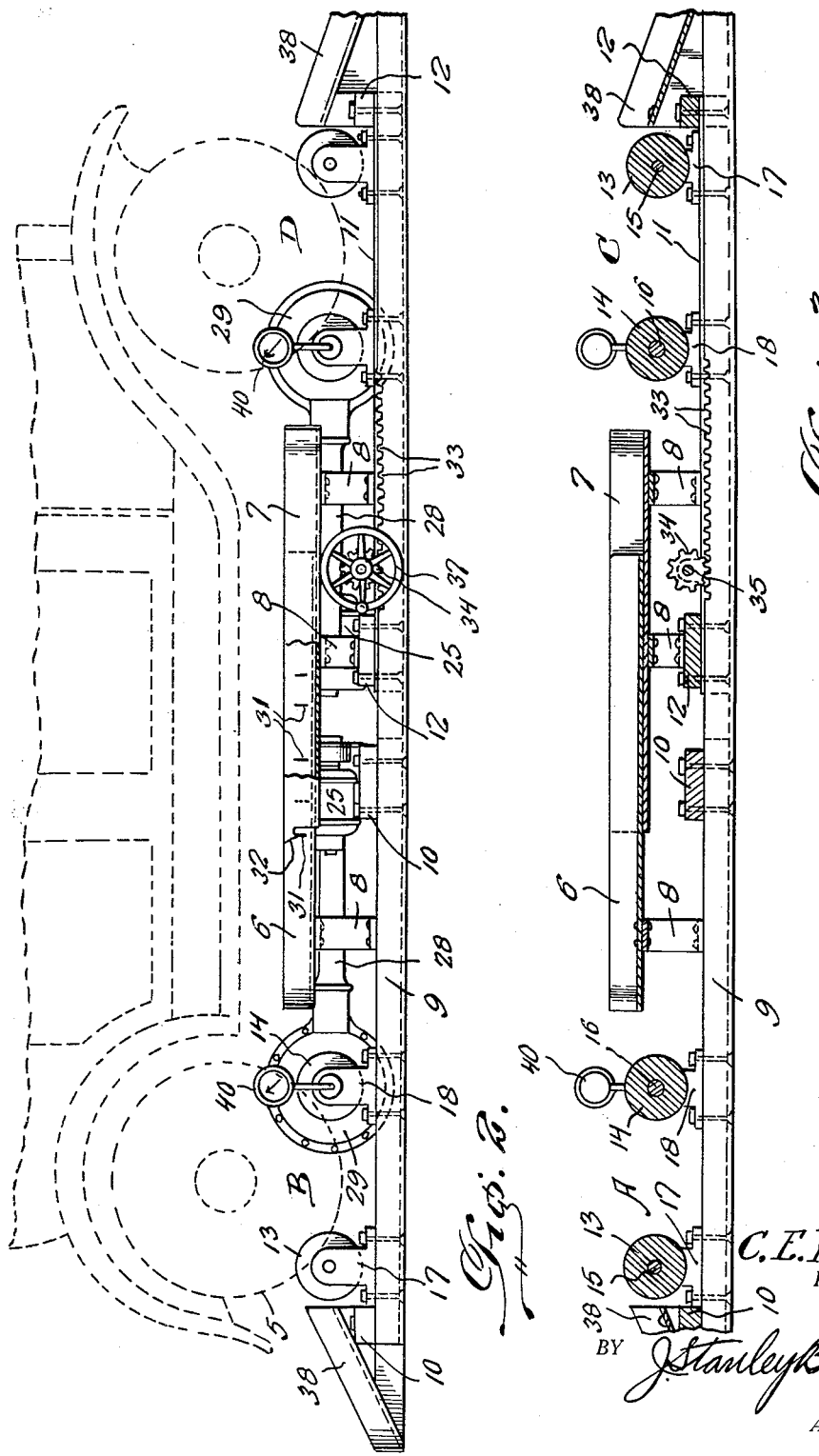
C. E. Yorgason,
INVENTOR.
BY J. Stanley Burch
ATTORNEY.

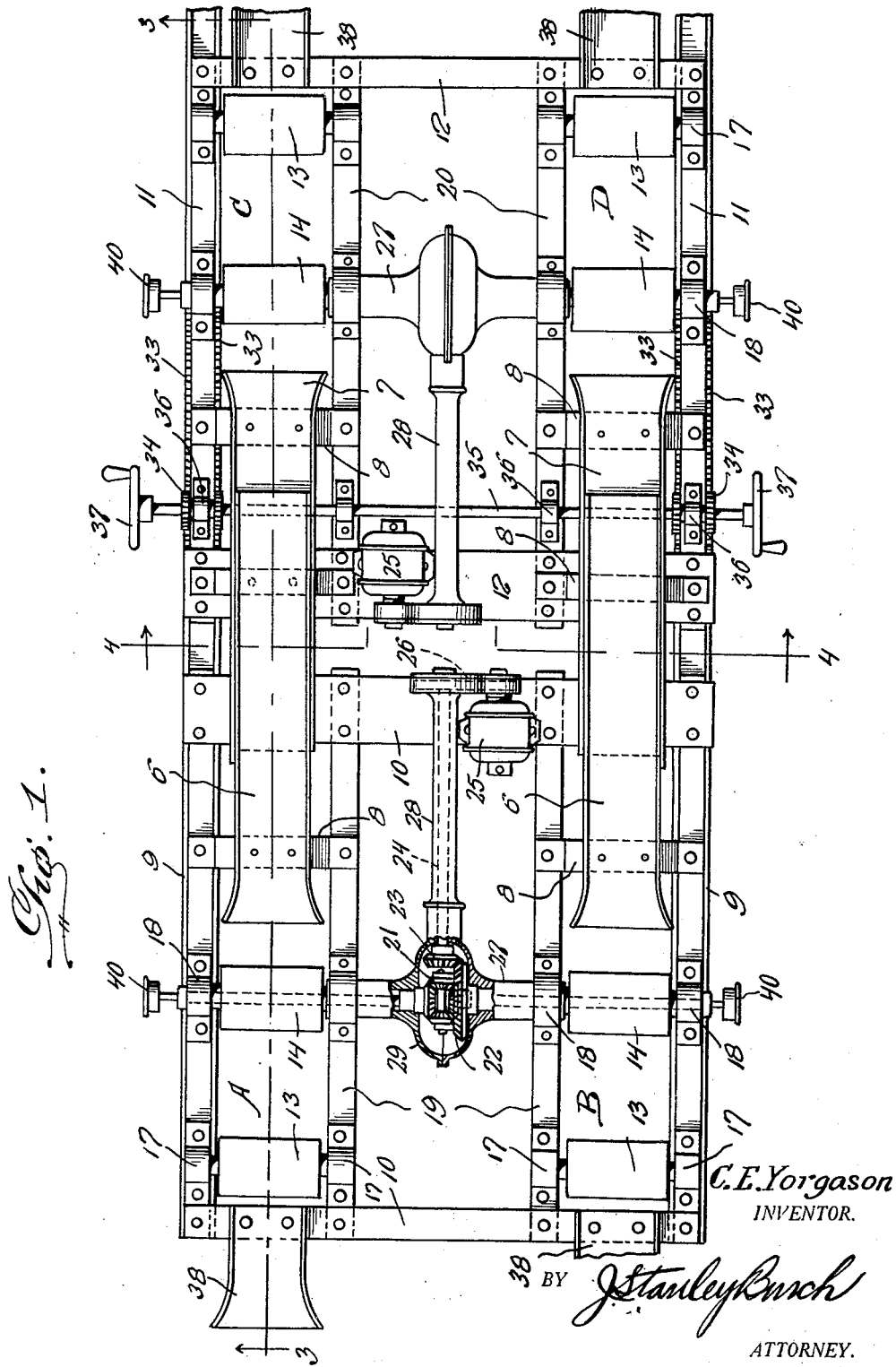

Jan. 10, 1933.  C. E. YORGASON  1,893,529
AUTOMOBILE BRAKE TESTING DEVICE
Filed Dec. 10, 1929   3 Sheets-Sheet 3
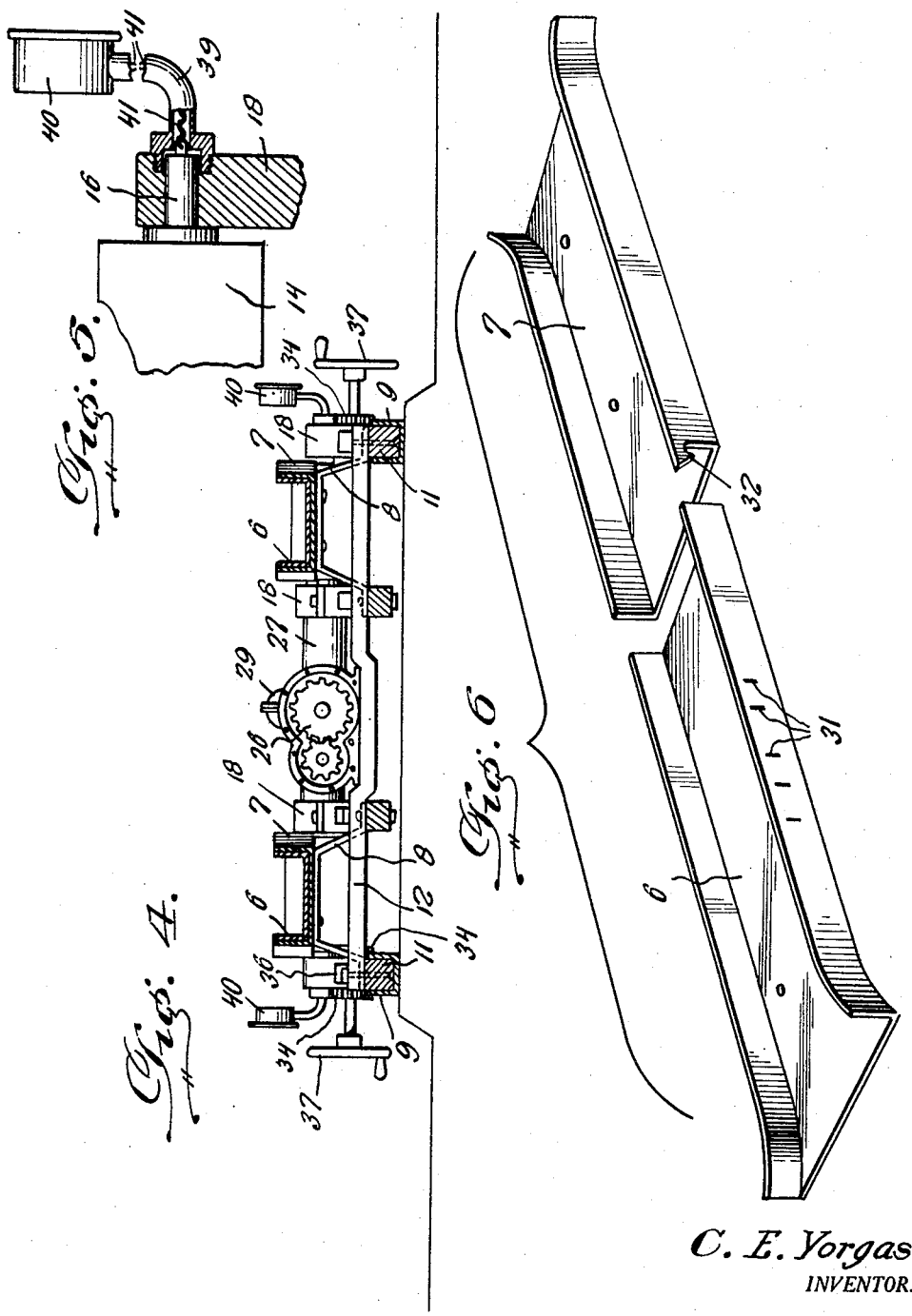
C. E. Yorgason
INVENTOR.
BY J. Stanley Burch
ATTORNEY.

Patented Jan. 10, 1933

1,893,529

UNITED STATES PATENT OFFICE

CHARLES E. YORGASON, OF OGDEN CITY, UTAH

AUTOMOBILE BRAKE TESTING DEVICE

Application filed December 10, 1929. Serial No. 412,997.

This invention relates to improvements in brake testing devices for automobiles, and the primary object of the invention is to provide a device of this character which is adapted for testing the brakes of motor vehicles equipped with either the two-wheel or four-wheel brake system.

A more particular object of the invention is to provide a simple portable brake-testing stand embodying means for simultaneously testing all of the brakes of a motor vehicle, the speed of each wheel, with brake applied, being shown by an individual indicator.

Another object is to provide a brake testing stand of the above kind embodying elevated horizontal tracks, sets of grooved rollers arranged at opposite ends of the tracks in position to support the four wheels of an automobile, each set of rollers comprising an idler and a power driven roller, the power driven rollers of opposite sets being driven by a common differential gearing, whereby a slowing down of any one of said driven rollers is permitted independently of the other driven rollers due to increased brake pressure on any one of the automobile wheels, a roller of each set being connected with an independent indicator to indicate the brake resistance of each wheel, and inclined ways leading to the sets of rollers at each end of the stand.

Still another object is to provide a testing stand of the above kind in which the horizontal tracks, the sets of rollers, and the inclined ways are mounted on a base, the base and the horizontal tracks being extensible to vary the distance between the sets of rollers at opposite ends of the stand and to thereby adapt the stand to automobiles of different wheelbase lengths.

Other objects will appear as the nature of the invention is better understood, and the invention consists in the novel form, combination and arrangement of parts hereinafter more fully described, shown in the accompanying drawings, and claimed.

In the drawings:

Figure 1 is a top plan view, partly broken away, of a brake testing stand embodying the present invention.

Figure 2 is a side elevational view thereof.

Figure 3 is a vertical longitudinal section on line 3—3 of Figure 1.

Figure 4 is a transverse vertical section on line 4—4 of Figure 1.

Figure 5 is a fragmentary detail section, showing the mounting of one of the indicators and its connection with the adjacent driven roller; and Figure 6 is a developed perspective view of one of the extensible horizontal tracks.

The present invention embodies a stand which includes a pair of extensible elevated horizontal tracks upon which the wheels 5 of the automobile to be tested will run, each track consisting of a pair of slidably telescoped channel-shaped sections 6 and 7. These horizontal tracks are supported by standards 8 on an extensible base embodying longitudinal channels 9 rigidly connected by cross members 10, and longitudinal bars 11 slidably fitted in the channels 9 at one end of the stand and rigidly connected by cross members 12, the sections 6 of the tracks being fixed to the channels 9 and the sections 7 thereof being fixed to the bars 11.

Mounted on the base are four sets of suitable rollers A, B, C, and D, the sets A and B being arranged at corresponding ends of the horizontal tracks and mounted on the respective channels 9, and the sets C and D being arranged at the opposite corresponding ends of the horizontal tracks and mounted on the respective bars 11. Each set of rollers comprises an idler roller 13 and a power-driven roller 14 respectively carried by shafts 15 and 16 mounted in bearings at the upper ends of standards 17 and 18, the standards of the sets A and B being fastened on the channels 9 and inner rails 19, and those of the sets C and D being fastened on the bars 11 and inner rails 20. The rails 19 are connected with the channels 9 by the cross members 10, and the rails 20 are connected with the bars 11 by the cross members 12.

The shafts 16 of the power driven rollers at each end of the stand are connected at their inner ends by means of a differential gearing 21 having a driving gear 22 meshing with a pinion 23 on the adjacent outer end of a longitudinal drive shaft 24 whose inner end is geared to a motor 25 as at 26. The shafts 16 and 24 at the opposite ends of the stand are journaled in housings 27 and 28 respectively supported by the adjacent rails 19 and cross member 10 and the rails 20 and cross member 12, the housings 27 having integral intermediate differential casings 29 for the gearings 21. The motors 25 may be respectively mounted on the cross members 10 and 12 and geared to the adjacent drive shafts 24 and 26 by spur gearing suitably encased as at 30. An individual driving unit is thus provided for the driven rollers at each end of the stand in which the gears may run in oil baths to minimize wear and noise. Moreover, the driving unit for the rollers of the sets C and D is bodily with the bars 11 and the track sections 7 relative to the driving unit for the sets A and B and the channels 9 and track sections 6, thus permitting ready adjustment of the stand as to length to accommodate cars of different wheel-base lengths. To facilitate proper adjustment of the stands, means may be provided to indicate the relative positions of the track sections 6 and 7 for the cars of different wheel-base lengths, such indicating means comprising a longitudinal series of graduations 31 on the outer flange of each track section 6 and an indicating tooth 32 on the adjacent end of the outer flange of each track section 6 arranged to cooperate with said graduations.

The upper edges of the flanges of the channels 9 are formed with rack teeth 33 which mesh with pinions 34 fixed on a transverse shaft 35 which is mounted in bearings 36 fixed on the bars 11 and the rails 20. The outer ends of the shaft 35 have hand wheels 37 for use in turning said shaft so that the pinions 34 may be caused to travel on the racks 33 and thereby move the bars 11 and the sets of rollers C and D relative to the channels 9 and the sets of rollers A and B. The tracks 6, 7 bridge the spaces between the rollers A and C and B and D so that the wheels at one end of the automobile may pass from the rollers at one end of the stand to the rollers at the other end of the stand. Inclined ways 38 are mounted on the cross members 10 and 12 at the opposite ends of the stand, one inclined way leading to each set of rollers. Thus, the automobile may be run onto the stand from either end.

Mounted by a tubular bracket 39 on the outer standard 18 of each driven rollers 14 is a speedometer or like indicator 40 having its indicating mechanism connected to the shaft 16 of said roller by means of a flexible shaft 41 extending through said tubular bracket. These indicators will thus indicate the speed of each automobile wheel as governed by the pressure applied by the respective brakes thereof.

In practice, when it is desired to test the brakes of a car having the four-wheel brake system, the car is driven or backed up the inclined ways at one end of the stand onto the rollers, so that each wheel of the car will rest partly on an idler roller and partly on a driven roller as shown in Figure 2. It will of course be understood that before driving the car onto the stand the latter will be properly adjusted as to length in accordance with the wheel base length of the car whose brakes are to be tested, such adjustment of the stand being effected by rotation of the shaft 35 in the desired direction. Obviously, this will result in movement of the sets of rollers A and B and corresponding adjustment of the tracks 6, 7 as to length, to accord with the change in distance between the sets of rollers A and B and the sets of rollers C and D. Power is then applied to the rollers 14 through the motors 25, the drive shafts 24, and the two sets of differential gearings operated thereby. In this way the wheels of the automobile are driven simultaneously at a uniform rate of speed, the wheels of the automobile and the driven rollers traveling at the same peripheral speed. The speeds of the driven rollers are registered automatically on the indicators 40, and if no influences are exerted, other than the turning force of the drive rollers 14, the indicators for the four car wheels will register the same speed. However, when the brakes are applied to the four wheels, there is an immediate slowing down of the wheels in proportion to the effectiveness of the brakes, and this slowing down of the speed of the wheels instantly affects the drive wheels 14 in the same manner as the automobile wheels driven thereby. If a brake at either end of the car exerts a greater brake pressure than the other brake at the same end of the car, the variation will be registered by the associated indicators, and the brakes can be adjusted and tested until the desired results are obtained. The differential gearings permit any one of the associated driven rollers 14 to slow down under increased resistance, independently of the other associated driven roller 14, so that the exact pressure applied by each brake can be correctly ascertained.

The construction shown and described above is particularly adapted for permitting all four brakes of a car to be tested simultaneously. However, by eliminating the inclined ways and the sets of rollers at one end of the stand, together with the driving means for the eliminated sets of rollers, a simpler construction may be had for testing the front and rear brakes of a car separately, or for testing two-wheel brakes. In the latter instance, it would only be necessary to back the rear wheels of a car upon the testing rollers.

It is believed that the above description, when considered in connection with the drawings, will render the invention and its operation entirely clear to those skilled in the art. Obviously, minor changes in the details of construction may be made without departing from the spirit and scope of the invention as claimed.

What is claimed is:

A brake testing stand comprising spaced parallel base members, each member including telescopic channel-like sections, transverse members connecting the corresponding sections of the respective members, brackets rising from said sections, a pair of tracks supported by said brackets, each track including telescopic sections simultaneously adjustable with the base members, rack teeth formed on the upper edges of corresponding sections of the base members, a transverse shaft journaled on the stand, pinions fixed on said shaft and meshing with the teeth to simultaneously vary the length of the base members and track incident to the rotation of the shaft, opposite sets of rollers for supporting the wheels of an automobile mounted at each end of the base, power driven gearing for driving corresponding rollers of said sets and permitting a slowing down of either of said driven rollers independently of the other roller at the same end of the stand under increased resistance, and means for indicating the speed of each driven roller.

In testimony whereof I affix my signature.

CHARLES E. YORGASON.